(12) United States Patent
Ikeda et al.

(10) Patent No.: US 9,806,342 B2
(45) Date of Patent: *Oct. 31, 2017

(54) NEGATIVE ELECTRODE ACTIVE MATERIAL OF LITHIUM SECONDARY BATTERY, NEGATIVE ELECTRODE OF LITHIUM SECONDARY BATTERY, LITHIUM SECONDARY BATTERY FOR VEHICLE INSTALLATION USING THE NEGATIVE ELECTRODE ACTIVE MATERIAL AND NEGATIVE ELECTRODE, AND METHOD FOR MANUFACTURING THE NEGATIVE ELECTRODE ACTIVE MATERIAL

(75) Inventors: Taisa Ikeda, Kitakyushu (JP); Kazuki Tagawa, Kitakyushu (JP); Yoichi Kawano, Kitakyushu (JP)

(73) Assignee: NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 13/319,402

(22) PCT Filed: May 13, 2010

(86) PCT No.: PCT/JP2010/003249
§ 371 (c)(1),
(2), (4) Date: Dec. 14, 2011

(87) PCT Pub. No.: WO2010/131473
PCT Pub. Date: Nov. 18, 2010

(65) Prior Publication Data
US 2012/0112126 A1    May 10, 2012

(30) Foreign Application Priority Data

May 15, 2009   (JP) ................................. 2009-118854
Nov. 24, 2009  (JP) ................................. 2009-266764

(51) Int. Cl.
*H01M 4/583*    (2010.01)
*H01M 4/62*     (2006.01)
*H01M 4/587*    (2010.01)
*H01M 4/133*    (2010.01)
*H01M 4/1393*   (2010.01)
*H01M 4/36*     (2006.01)
*H01M 10/0525*  (2010.01)
*H01M 4/02*     (2006.01)

(52) U.S. Cl.
CPC ........... *H01M 4/587* (2013.01); *H01M 4/133* (2013.01); *H01M 4/1393* (2013.01); *H01M 4/364* (2013.01); *H01M 4/622* (2013.01); *H01M 4/623* (2013.01); *H01M 10/0525* (2013.01); *H01M 2004/021* (2013.01); *H01M 2220/20* (2013.01); *Y02E 60/122* (2013.01); *Y02P 70/54* (2015.11); *Y02T 10/7011* (2013.01)

(58) Field of Classification Search
CPC .... H01M 4/587; H01M 4/133; H01M 4/1393; H01M 4/622; H01M 4/623; H01M 4/364; H01M 10/0525; H01M 2004/021; H01M 2220/20; Y02E 60/122
USPC ................................ 429/218–224; 252/182.1
See application file for complete search history.

(56) References Cited

U.S. PATENT DOCUMENTS

| 3,001,237 | A |   | 9/1961  | Balaguer |
| 4,294,893 | A | * | 10/1981 | Iemmi et al. ................. 429/510 |
| 4,668,595 | A |   | 5/1987  | Yoshino et al. |
| RE34,991  | E |   | 7/1995  | Yoshino et al. |
| 5,601,950 | A | * | 2/1997  | Yamahira .............. H01M 4/587 |
|           |   |   |         | 429/231.8 |
| 5,639,576 | A |   | 6/1997  | Lewis et al. |
| 5,910,383 | A | * | 6/1999  | Hase ....................... C01B 31/04 |
|           |   |   |         | 423/447.4 |
| 5,958,622 | A |   | 9/1999  | Kojima et al. |
| 2009/0242849 | A1 | * | 10/2009 | Sudoh et al. ................. 252/502 |
| 2009/0280413 | A1 |   | 11/2009 | Ohta et al. |
| 2011/0236767 | A1 | * | 9/2011  | Sotowa ............... H01M 4/0471 |
|           |   |   |         | 429/338 |

FOREIGN PATENT DOCUMENTS

| CA | 1 265 580 A1 |   | 2/1990  | |
| CH |    682078 A5 | * | 7/1993  | ............ C10B 51/00 |
| DE | 197 03 954 A1 |   | 12/1997 | |
| EP | 0 205 856 A2 |   | 12/1986 | |
| EP | 1 928 047 A1 |   | 6/2008  | |
| JP | A-52-133098   |   | 11/1977 | |
| JP | 54-131591     | * | 10/1979 | ............ C01B 31/04 |
| JP | 59-078914     | * | 5/1984  | ............ C01B 31/04 |
| JP | A-62-090863   |   | 4/1987  | |
| JP | A-01-221859   |   | 9/1989  | |
| JP | 04-201015     | * | 7/1992  | ............. B23H 1/04 |
| JP | A-04-228411   |   | 8/1992  | |
| JP | A-04-228412   |   | 8/1992  | |
| JP | A-05-043318   |   | 2/1993  | |

(Continued)

OTHER PUBLICATIONS

Jan. 2, 2014 Supplementary European Search Report issued in European Application No. 10774732.1.

*Primary Examiner* — Osei Amponsah
(74) *Attorney, Agent, or Firm* — Oliff PLC

(57) ABSTRACT

A negative electrode active material of lithium secondary battery includes: at least one of a petroleum-derived green coke and a coal-derived green coke; and at least one of a petroleum-derived calcined coke and a coal-derived calcined coke within a mass ratio range of 90:10 to 10:90 which are fired.

4 Claims, No Drawings

(56) References Cited

FOREIGN PATENT DOCUMENTS

| | | | | |
|---|---|---|---|---|
| JP | A-06-005287 | | 1/1994 | |
| JP | 08-102324 | * | 4/1996 | ............. H01M 4/58 |
| JP | A-08-102324 | | 4/1996 | |
| JP | A-08-287911 | | 11/1996 | |
| JP | A-09-320571 | | 12/1997 | |
| JP | A-09-320602 | | 12/1997 | |
| JP | A-2003-297357 | | 10/2003 | |
| JP | A-2007-019257 | | 1/2007 | |
| WO | WO 2008/026380 A1 | | 3/2008 | |
| WO | WO 2009/022664 A1 | | 2/2009 | |

* cited by examiner

NEGATIVE ELECTRODE ACTIVE MATERIAL OF LITHIUM SECONDARY BATTERY, NEGATIVE ELECTRODE OF LITHIUM SECONDARY BATTERY, LITHIUM SECONDARY BATTERY FOR VEHICLE INSTALLATION USING THE NEGATIVE ELECTRODE ACTIVE MATERIAL AND NEGATIVE ELECTRODE, AND METHOD FOR MANUFACTURING THE NEGATIVE ELECTRODE ACTIVE MATERIAL

TECHNICAL FIELD

The present invention relates to a negative electrode active material of a lithium secondary battery, a negative electrode of lithium secondary battery, a lithium secondary battery using the negative electrode active material and the negative electrode, and a method for manufacturing the negative electrode active material.

BACKGROUND ART

Since a lithium secondary battery has a high energy density in comparison with another secondary battery, the lithium secondary battery can be downsized and reduced in weight. In this point of view, the lithium secondary battery is frequently utilized as an electric source of a mobile electric device such as a cellular phone, a personal computer, a personal digital assistant (PDA) and a handy video camera and in the future, the demand as the electric source is promising to be increased more than ever.

In order to cope with energy problem and environmental problem, moreover, an electric vehicle or a hybrid electric vehicle with a combination of a motor driven by a nickel hydride battery and a gasoline engine are developed and diffused conspicuously. In this vehicle use, the high performance of the battery to be used is required to be developed more than ever and thus, attention is paid to the lithium secondary battery.

In the lithium secondary battery, various carbon materials with excellent safety and lifetime are generally used as the negative electrode active material. Among the carbon materials, graphite can be obtained at a high temperature at least more than 2000° C., normally within a range of about 2600 to 3000° C. and is excellent material because of having a high energy density, but has some problems in high input/output characteristics and cycle characteristic. In this point of view, for the use of the electric vehicle and the storage battery requiring the high input/output characteristics, for example, low crystalline carbon with low degree of graphitization, which is fired at a lower temperature in comparison with graphite, is mainly researched and used.

In order to respond to the requirement of the high performance of the electric vehicle, recently, the lithium secondary battery is required to be highly developed in performance, which calls for urgent attention. With regard to the characteristics of the lithium secondary battery, the electric potential in the side of the negative electrode is sufficiently reduced to enhance the actual battery voltage and thus exhibit the highly and sufficiently output characteristic.

Moreover, the discharge capacity of the lithium secondary battery is an important characteristic in view of the sufficient supply of a current which is an energy source for the electric vehicle. Furthermore, the ratio of the charging capacity to the discharging capacity, that is, the initial efficiency is required to be set higher in view of the larger amount of discharging current in comparison with the amount of charging current.

In addition, it is preferable that the lithium secondary battery maintains a higher charging capacity even at high current density so as to realize the charging process in a short period of time so that the capacity retention rate of the lithium secondary battery is required to be developed. Namely, it is required for the lithium secondary battery that the output characteristic, the discharging capacity, the initial efficiency and the capacity retention rate are developed under the proper balance condition.

In order to achieve the aforementioned requirement, as the negative electrode active material of the lithium secondary battery are intensely researched and developed carbon materials such as coke or graphite. In this case, the discharge capacity can be developed, but the initial efficiency cannot be sufficiently developed. Moreover, the actual battery voltage is not sufficient so as not to satisfy the requirement for the high output characteristic and the capacity retention rate.

In Reference 1, for example, as the negative electrode material utilizing intercalation or doping is disclosed a carbonaceous material defined in specific surface and X-ray diffraction crystal thickness, the carbonaceous material being obtained through the thermal decomposition or carbonization of an organic compound. However, the thus obtained negative electrode material is not sufficient for the use of a vehicle such as the hybrid electric vehicle.

In Reference 2, as the negative electrode material is disclosed a carbon material with excellent cycle characteristic and higher discharge capacity, the carbon material being obtained through the thermal treatment for calcined coke as a raw material to remove impurities therefrom under a non-reactive atmosphere. However, the thus obtained negative electrode material is not sufficient in output characteristic and the like for the use of vehicle installation such as the hybrid electric vehicle.

In Reference 3, as the negative electrode material is disclosed a carbon material, the carbon material being obtained through the thermal treatment for a carbonaceous material with a specific cover layer which the carbonaceous material has a crystalline structure similar to that of graphite. In Reference 4, as the negative electrode material is disclosed a carbon material with high discharge capacity, the carbon material being obtained through the thermal treatment at low temperature for coke as a raw material under a non-reactive atmosphere to remove impurities therefrom. However, both of the carbon materials are not sufficient in battery characteristics for the use of vehicle installation such as the hybrid electric vehicle.

In Reference 5, as the negative electrode material is disclosed a thermally treated coke for providing a lithium secondary battery with high charge capacity and discharge capacity, the coke being obtained through the thermal treatment within a temperature range of 500 to 850° C. for a green coke derive from a petroleum or a coal. However, the coke is not sufficient in output characteristic for the use of vehicle installation such as the hybrid electric vehicle.

The research and development of the negative electrode material of the lithium secondary battery made of the low crystalline carbon material using the coke or the like as the raw material is directed at the improvement in characteristic of the negative electrode material of the lithium secondary battery for the use of an electric source for a small mobile instruments, but, as of now, the research and development of the negative electrode material of the lithium secondary battery is not directed at the enhancement in characteristic of the negative electrode material of the lithium secondary battery with large current input/output characteristics suitable for the use of an electric source for the hybrid electric vehicle.

REFERENCE LIST

Reference 1: JP-A 62-90863
Reference 2: JP-A 01-221859
Reference 3: JP-A 06-5287
Reference 4: JP-A 08-102324
Reference 5: JP-A 09-320602

DISCLOSURE OF THE INVENTION

Problem to be Solved by the Invention

It is an object of the present invention to provide a new negative electrode active material which can develop the output characteristic of a lithium secondary battery and have actual characteristics such as discharge capacity, initial efficiency and capacity retention rate which are required for the use of vehicle installation such as a hybrid electric vehicle.

Technical Solution

The present invention relates to a negative electrode active material of lithium secondary battery, including: at least one of a petroleum-derived green coke and a coal-derived green coke; and at least one of a petroleum-derived calcined coke and a coal-derived calcined coke within a mass ratio range of 90:10 to 10:90 which are fired. The inventors had intensely studies to achieve the aforementioned object. As a result, the inventors have found out that the aforementioned negative electrode active material according to the present invention can sufficiently reduce the electric potential of the negative electrode of the lithium secondary battery so as to enhance the actual battery voltage thereof and have some practical characteristics such as output characteristic, discharge capacity, initial efficiency and capacity retention rate which are required in the use of vehicle installation.

Here, the term "green coke derived from the coal or the like" means a coke obtained through the thermal decomposition and polycondensation of a petroleum-derived heavy oil and/or coal-derived heavy oil at a maximum achieving temperature within a range of 400 to 700° C. for about 24 hours by using a coking machine such as a delayed coker. Moreover, the term "calcined coke derived from the coal or the like" means a coke calcined for the green coke derived from the coal or the like and/or for a petroleum-derived and/or coal-derived coke(s) which are calcined at a maximum achieving temperature within a range of 800 to 1500° C.

Advantageous Effect

According to the present invention can be provided a new negative electrode active material which can develop the output characteristic of a lithium secondary battery and have actual characteristics such as discharge capacity, initial efficiency and capacity retention rate which are required for the use of vehicle installation such as a hybrid electric vehicle.

BEST MODE FOR CARRYING OUT THE INVENTION

Hereinafter, details, other features and advantages of the present invention will be described.

In the negative electrode active material of a lithium secondary battery according to the present invention, first of all, a coal-derived heavy oil or the like is thermally decomposed and polycondensed at a maximum achieving temperature within a temperature range of 400 to 700° C. for 24 hours by using a coking machine such as a delayed coker to obtain a green coke derived from the coal or the like. Then, the green coke is pulverized into particles with a predetermined size. The pulverization process is conducted by a pulverizing machine industrially available. Concretely, an atomizer, a Raymond mill, an impeller mill, a ball mill, a cutter mill, a jet mill or a hybridizer may be exemplified, but not restrictive.

The heavy oil to be used may be a petroleum-derived heavy oil or a coal-derived heavy oil, but preferably the coal-derived heavy oil because the coal-derived heavy oil is rich in aromaticity so as to have little amounts of hetero elements such as nitrogen and sulfur causing the irreversible reaction and have little amounts of volatiles.

The green coke derived from the coal or the like is calcined at a maximum achieving temperature within a temperature range of 800 to 1500° C. to produce a calcined coke derived from the coal or the like. The maximum achieving temperature is preferably set within a temperature range of 1000 to 1500° C., more preferably within a temperature range of 1200 to 1500° C. The calcination process may be conducted by using an appropriate calciner such as a Riedhammer oven capable of conducting mass thermal treatment, a shuttle oven, a tunnel kiln oven, a rotary kiln oven, a roller hearth kiln oven or a microwave, but not restrictive. The calciner may be a continuous calciner or a batch calciner. Then, the thus obtained lump calcined coke derived from the coal or the like is pulverized into particles using a pulverizing machine such as the atomizer industrially available.

The sizes of the green coke particles and the calcined coke particles are not particularly limited, but the respective average particle sizes as median sizes of the green coke particles and the calcined coke particles are set preferably within a range of 5 to 15 μm while the respective BET specific surface areas thereof are preferably set to 5 $m^2/g$ or less. If the average particle sizes thereof are set less than 5 μm, the BET specific surface areas may be too increased. If the average particle sizes thereof are set more than 15 μm, the energy efficiency of the lithium secondary battery made of the green coke particles and the calcined coke particles may be lowered. The BET specific surface areas thereof may be set to 2 $m^2/g$ or more in view of the formation of micro pores therein.

Then, the green coke particles and the calcined coke particles are mixed at a predetermined ratio. For example, the mixing ratio thereof (green coke particles:calcined coke particles) is preferably set within a range of 90:10 to 10:90 at mass ratio, more preferably within a range of 70:30 to 30:70 at mass ratio. If the ratio of the calcined coke is increased, the electric potential in the side of the negative electrode of the obtained lithium secondary battery can be reduced sufficiently so as to enhance the output characteristic thereof. If the ratio of the green coke is increased, the discharge capacity and the initial characteristic of the obtained lithium secondary battery are enhanced. Depending on which of the characteristics is enhanced, the ratio of the calcined coke is set to 50% or more if the output characteristic of the lithium secondary battery is enhanced.

If the mixing ratio is set except the aforementioned range, the negative electrode of the lithium secondary battery made of the negative electrode active material may not be sufficiently reduced in electric potential so as not to enhance the actual battery voltage thereof and realize the sufficiently high output characteristic thereof. Moreover, the resistance of the lithium secondary battery may be increased at the end of charge and discharge so that the lithium secondary battery may not exhibit the stable charge/discharge characteristic thereof.

Then, the green particles and the calcined particles are fired. The firing temperature is preferably set within a maximum achieving temperature within a range of 800 to 1400° C., more preferably within a range of 900 to 1200° C., and particularly preferably within a range of 900 to 1100° C. If the firing temperature is set more than the upper limited value, the crystal growth in the coke particles is too progressed and adversely affects the battery characteristic balance of the obtained lithium secondary battery, which is undesirable in view of the mass production of the lithium secondary battery. On the other hand, if the firing temperature is set less than the lower limited value, the crystal growth in the coke particles is suppressed and likely to adversely affect the battery characteristic balance.

The holding time at the maximum achieving temperature is not limited, but preferably set to 30 minutes or more. Moreover, the firing atmosphere is not limited, but may be set to non-reactive atmosphere such as argon atmosphere or nitrogen atmosphere or non-oxidizing atmosphere which is realized in a non-airtight atmosphere such as in a rotary kiln oven or in an airtight atmosphere such as in a Riedhammer oven.

In the case where the negative electrode active material is applied to the negative electrode of the lithium secondary battery, as a positive electrode active material may be used lithium-containing transition metal oxides $LiM(1)xO_2$ or $LiM(1)_yM(2)_{2-y}O_4$ (wherein M(1) and M(2) are a transition metal selected from the group consisting of Co, Ni, Mn, Ti, Cr, V, Fe, Zn, Al, Sn and In, respectively, and x and y are independently numbers in a range of 0-1), transition metal chalcogenides ($TiS_2$, $NbSe_3$, etc.), vanadium oxides ($V_2O_5$, $V_6O_{13}$, $V_2O_4$, $V_3O_8$, etc.) and lithium compounds thereof, Chevrel phase compound represented by the general formula $M_xMo_6Ch_{8-y}$ (wherein x is a number in a range of 0-4, y is a number in a range of 0-1, M is a metal such as transition metal and Ch denotes a chalcogen), activated carbon and activated carbon fibers.

As an electrolyte for charging the space between the positive electrode and the negative electrode can be used singly or as a mixture of two kinds or more a conventionally well known electrolyte material such as $LiClO_4$, $LiBF_4$, $LiPF_6$, $LiAsF_6$, $LiB(C_6H_5)$, LiCl, LiBr, $Li_3SO_3$, $Li(CF_3SO_2)_2N$, $Li(CF_3CF_2CH_2OSO_2)_2N$, $Li(HCF_2CF_2CH_2OSO_2)_2N$, $Li[(CF_3)_2CHOSO_2]_2N$ or $LiB[C_6H_3(CF_3)_2]_4$.

The following compounds are examples of nonaqueous electrolytes and may be used singly or as a mixture of two kinds or more although there is no specific restriction on the selection of nonaqueous electrolytes; propylene carbonate, ethylene carbonate, butylene carbonate, chloroethylene carbonate, dimethyl carbonate, diethyl carbonate, ethyl methyl carbonate, 1,1-dimethoxyethane, 1,2-dimethoxyethane, 1,2-diethoxyethane, γ-butyrolactone, tetrahydrofuran, 2-methyl-tetrahydrofuran, 1,3-dioxolane, 4-methyl-1,3-dioxolane, anisole, diethyl ether, sulfolane, methylsulfolane, acetonitrile, chloronitrile, propionitrile, trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazolidone, ethylene glycol, sulfites, and dimethyl sulfite.

In the case where the negative electrode of the lithium secondary battery is made of the negative electrode active material, as a carbonaceous binder is generally used fluorine-based resin powder made polyvinylidene fluoride (PVDF), etc., or a water-soluble bond such as polyimide, polyamide imide, siloxane polyimide, stylene-butadiene rubber (SBR) or carboxymethylcellulose. Then, the negative electrode active material and the binder are mixed in a solvent such as N-methylpyrrolidone (NMP), dimethylformamide, water or alcohol to make a slurry. Then, the slurry is applied and dried onto a current collector.

EXAMPLES

Hereinafter, the present invention will be concretely described with reference to examples (negative electrode active material of lithium secondary battery), reference examples and comparative examples, but not restricted to these examples.

Example 1

A lump coke (green coke) manufactured by thermally treating a purified pitch, which was obtained by removing quinoline-insoluble components from a coal-derived heavy oil, at a temperature of 500° C. for 24 hours by means of delayed coking, was pulverized and regulated in size with a jet mill to make green coke particles with an average particle size of 9.9 μm.

Then, the lump green coke obtained in the same manner as described above was thermally treated for 1 hour or more by means of a rotary kiln oven under the condition that the temperature distribution in the oven is set so as to change from a temperature of 700° C. in the vicinity of the inlet of the oven to a temperature of 1500° C. (maximum achieving temperature) in the vicinity of the outlet of the oven to make a lump calcined coke. Then, the lump calcined coke was pulverized and regulated in size with a jet mill to make calcined coke particles with an average particle size of 9.5 μm.

Then, 70 parts by mass of the green coke particles were mixed with 30 parts by mass of the calcined coke particles to make a coke material of 100 parts by mass. Then, the coke material was heated from room temperature to 900° C. (maximum achieving temperature) at a heating rate of 600° C./hour and kept for 2 hours to be carbonized (fired), thereby making a negative electrode active material of lithium secondary battery.

Then, polyvinylidene fluoride (PVDF, made by KUREHA CORPORATION) was added as a binder to the negative electrode active material by 5 mass %, and the thus obtained mixture was kneaded using N-methylpyrrolidone as a solvent to make a slurry. The slurry was coated uniformly on a copper foil with a thickness of 18 μm to make a negative electrode foil. Then, the negative electrode foil was dried and pressed in a predetermined electrode density to make an electrode sheet. Then, the negative electrode sheet was cut out in a form of circle to make a negative electrode with a diameter of 15 mm. In order to evaluate the electrode characteristics of only the negative electrode, a metallic lithium with a diameter of 15.5 mm was used as a counter electrode.

LiPF$_6$ with a concentration of 1 mol/l was added into the mixture of ethylene carbonate and diethyl carbonate (mixing volume ratio=1:1) and the thus obtained solution was used as an electrolysis solution. Then, a coil cell was made from propylene porous film as a separator. Next, the discharge characteristics for the thus obtained lithium secondary battery were evaluated when a constant current discharge of 5 mA/cm$^2$ was conducted under a constant temperature of 25° C. within a predetermined voltage range of which the charge lower limited voltage of terminal voltage was set to 0 V and of which the discharge upper limited voltage was set to 1.5 V. The results relating to the discharge characteristics are listed in Table 1.

Examples 2 and 3

Intended negative electrode active materials were made in the same manner as in Example 1 except that the mixing ratios of the green particles and the calcined particles were varied to 50:50 from 70:30 (Example 2) and 30:70 from 70:30 (Example 3), respectively. The discharge characteristics were evaluated in the same manner as in Example 1. The thus obtained results are listed in Table 1.

Comparative Example 1

An intended negative electrode active material of lithium secondary battery was made in the same manner as in Example 1 except that 100 parts by mass of the green coke particles were used with no mixing of the calcined coke particles. The discharge characteristics were evaluated in the same manner as in Example 1. The thus obtained results are listed in Table 1.

Comparative Example 2

An intended negative electrode active material of lithium secondary battery was made in the same manner as in Example 1 except that 100 parts by mass of the calcined coke particles were used with no mixing of the green coke particles. The discharge characteristics were evaluated in the same manner as in Example 1. The thus obtained results are listed in Table 1.

Examples 4 to 6

Intended negative electrode active materials were made in the same manner as in Examples 1 to 3, respectively, except that the firing temperature (maximum achieving temperature) of the coke material was varied to 1000° C. from 900° C. The discharge characteristics were evaluated in the same manner as in Example 1. The thus obtained results are listed in Table 1.

Comparative Example 3

An intended negative electrode active material of lithium secondary battery was made in the same manner as in Example 4 except that 100 parts by mass of the green coke particles were used with no mixing of the calcined coke particles. The discharge characteristics were evaluated in the same manner as in Example 1. The thus obtained results are listed in Table 1.

Comparative Example 4

An intended negative electrode active material of lithium secondary battery was made in the same manner as in Example 4 except that 100 parts by mass of the calcined coke particles were used with no mixing of the green coke particles. The discharge characteristics were evaluated in the same manner as in Example 1. The thus obtained results are listed in Table 1.

Examples 7 to 9

Intended negative electrode active materials were made in the same manner as in Examples 1 to 3, respectively, except that the firing temperature (maximum achieving temperature) of the coke material was varied to 1100° C. from 900° C. The discharge characteristics were evaluated in the same manner as in Example 1. The thus obtained results are listed in Table 1.

Comparative Example 5

An intended negative electrode active material of lithium secondary battery was made in the same manner as in Example 7 except that 100 parts by mass of the green coke particles were used with no mixing of the calcined coke particles. The discharge characteristics were evaluated in the same manner as in Example 1. The thus obtained results are listed in Table 1.

Comparative Example 6

An intended negative electrode active material of lithium secondary battery was made in the same manner as in Example 7 except that 100 parts by mass of the calcined coke particles were used with no mixing of the green coke particles. The discharge characteristics were evaluated in the same manner as in Example 1. The thus obtained results are listed in Table 1.

TABLE 1

| | Carbon (part by mass) | Green coke (part by mass) | Calcined coke (part by mass) | Firing temperature (° C.) | DOD:50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|
| Comparative Example 1 | 100 | 100 | 0 | 900 | 0.66 | 9.3 | 456 | 77.4 | 96.8 | 79.7 | 59.1 |
| Example 1 | | 70 | 30 | | 0.61 | 10.3 | 427 | 81.1 | 96.2 | 81.6 | 70.2 |
| Example 2 | | 50 | 50 | | 0.49 | 12.7 | 358 | 82.7 | 94.8 | 85.9 | 77.0 |
| Example 3 | | 30 | 70 | | 0.42 | 14.0 | 324 | 85.2 | 96.1 | 89.0 | 82.7 |
| Comparative Example 2 | | 0 | 100 | | 0.25 | 17.0 | 243 | 86.2 | 99.2 | 96.3 | 95.9 |
| Comparative Example 3 | | 100 | 0 | 1,000 | 0.41 | 11.1 | 323 | 76.4 | 93.0 | 76.9 | 65.2 |
| Example 4 | | 70 | 30 | | 0.36 | 13.7 | 299 | 81.8 | 95.1 | 87.0 | 79.9 |

TABLE 1-continued

|  | Carbon (part by mass) | Green coke (part by mass) | Calcined coke (part by mass) | Firing temperature (° C.) | DOD:50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|
| Example 5 |  | 50 | 50 |  | 0.34 | 16.3 | 282 | 82.9 | 96.8 | 96.4 | 94.2 |
| Example 6 |  | 30 | 70 |  | 0.27 | 16.9 | 255 | 84.2 | 97.9 | 96.9 | 95.7 |
| Comparative Example 4 |  | 0 | 100 |  | 0.24 | 17.1 | 243 | 85.9 | 100.0 | 97.1 | 96.3 |
| Comparative Example 5 |  | 100 | 0 | 1,100 | 0.33 | 15.0 | 283 | 78.6 | 98.9 | 92.0 | 86.2 |
| Example 7 |  | 70 | 30 |  | 0.30 | 16.3 | 277 | 82.6 | 99.1 | 95.8 | 93.2 |
| Example 8 |  | 50 | 50 |  | 0.29 | 16.9 | 271 | 83.6 | 100.0 | 97.4 | 96.2 |
| Example 9 |  | 30 | 70 |  | 0.27 | 17.1 | 255 | 83.8 | 99.4 | 97.5 | 96.8 |
| Comparative Example 6 |  | 0 | 100 |  | 0.24 | 17.3 | 238 | 84.7 | 99.6 | 97.5 | 97.0 |

As is apparent from Table 1, in each of the lithium secondary batteries relating to Examples which are obtained by mixing the green coke particles and the calcined coke particles and firing the thus obtained mixture, the DOD (Depth of Discharge):50 is decreased and the output characteristic are increased as the mixing ratio of the calcined coke to the green coke is increased in comparison with each of the lithium secondary batteries relating to Comparative Examples. Namely, in Examples, the substantial electric voltage of each of the negative electrodes made of the carbon materials for negative electrode is decreased so that the actual battery voltage of the corresponding lithium secondary battery is increased, thereby enhancing the output characteristic thereof.

On the other hand, the discharge capacity (mAh/g) is decreased as the mixing ratio of the calcined coke to the green coke is increased. In Examples, moreover, each of the lithium secondary batteries does not exhibit the dependency of the initial efficiency on the mixing ratio, but can exhibit the initial efficiency of about 80% or more.

As a result, by mixing the green coke particles and the calcined coke particles, as shown in Examples, the lithium secondary battery with excellent performance balance relating to output characteristic, discharge capacity, initial efficiency and capacity retention rate can be obtained. Particularly, by setting the mixing ratio within a range of 70:30 to 30:70 by mass %, the negative electrode active material of lithium secondary battery with excellent discharge characteristics can be obtained so that the lithium secondary battery can have the output characteristic of 10 (W) or more, the discharge capacity (mAh/g) of 250 (mAh/g) or more, the initial efficiency of 80(%) or more and the capacity retention ratio of 70(%) or more.

In the case where the coke material made of only the green coke particles (with no calcined coke particles) was used as shown in Comparative Examples 1, 3 and 5, each of the obtained lithium secondary batteries has an initial efficiency of less than 80(%), which means that the initial efficiency of the lithium secondary battery obtained in each of Comparative Examples is poorer than the initial efficiency of the lithium secondary battery obtained in each of Examples. The capacity retention rate of the lithium secondary battery in each of Comparative Examples is also poorer than the capacity retention rate of the lithium secondary battery obtained in each of Examples at every firing temperature.

In the case where the coke material made of only the calcined coke particles (with no green coke particles) was used as shown in Comparative Examples 2, 4 and 6, each of the obtained lithium secondary batteries has a discharge capacity of less than 250 (mAh/g), which means that the discharge capacity of the lithium secondary battery obtained in each of Comparative Examples is poorer than the discharge capacity of the lithium secondary battery obtained in each of Examples.

Example 10

An intended lithium secondary battery was made in the same manner as in Example 2 except that the binder for making the negative electrode foil is varied to polyimide resin (made by UBE INDUSTRIES, LTD.) from polyvinylidene fluoride. The discharge characteristics were evaluated in the same manner as in Example 1. The thus obtained results are listed in Table 2. For comparison, the evaluated results in Example 2 are also listed in Table 2.

Example 11

An intended lithium secondary battery was made in the same manner as in Example 5 except that the binder for making the negative electrode foil is varied to polyimide resin (made by UBE INDUSTRIES, LTD.) from polyvinylidene fluoride. The discharge characteristics were evaluated in the same manner as in Example 1. The thus obtained results are listed in Table 2. For comparison, the evaluated results in Example 5 are also listed in Table 2.

Example 12

An intended lithium secondary battery was made in the same manner as in Example 8 except that the binder for making the negative electrode foil is varied to polyimide resin (made by UBE INDUSTRIES, LTD.) from polyvinylidene fluoride. The discharge characteristics were evaluated in the same manner as in Example 1. The thus obtained results are listed in Table 2. For comparison, the evaluated results in Example 8 are also listed in Table 2.

TABLE 2

| | Carbon (part by mass) | Green coke (part by mass) | Calcined coke (part by mass) | Firing temperature (° C.) | Binder | DOD:50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|---|
| Example 10 | 100 | 50 | 50 | 90 | PVDF | 0.49 | 12.7 | 358 | 82.7 | 94.8 | 85.9 | 77.0 |
| Example 2 | | | | | PI | 0.55 | 13.0 | 351 | 81.0 | 98.6 | 89.3 | 80.0 |
| Example 11 | | | | 1000 | PVDF | 0.34 | 16.3 | 282 | 82.9 | 96.8 | 96.4 | 94.2 |
| Example 5 | | | | | PI | 0.39 | 16.7 | 276 | 81.3 | 98.7 | 98.3 | 98.0 |
| Example 12 | | | | 1100 | PVDF | 0.29 | 16.9 | 271 | 83.6 | 100.0 | 97.4 | 96.2 |
| Example 8 | | | | | PI | 0.35 | 16.8 | 266 | 82.0 | 100.0 | 98.3 | 97.2 |

As is apparent from Table 2, even in the case where the binder to be used in the making of the negative electrode from the negative electrode active material of lithium secondary battery is varied to the polyimide from the polyvinylidene fluoride, the DOD (Depth of Discharge):50 is sufficiently reduced and the output characteristic are increased. Namely, the substantial electric voltage of each of the negative electrodes made of the carbon materials for negative electrode is decreased so that the actual battery voltage of the corresponding lithium secondary battery is increased, thereby enhancing the output characteristic thereof.

Moreover, the negative electrode active material of lithium secondary battery with excellent discharge characteristics can be obtained so that the lithium secondary battery can have the output characteristic of 13 (W) or more, the discharge capacity (mAh/g) of 260 (mAh/g) or more, the initial efficiency of 81(%) or more and the capacity retention ratio of 80(%) or more.

As is also apparent from Table 2, in the case where the binder to be used in the making of the negative electrode from the negative electrode active material of lithium secondary battery is made from the polyimide, the DOD (Depth of Discharge):50 is sufficiently reduced and the output characteristic are increased in comparison with the polyvinylidene fluoride binder for making the negative electrode from the negative electrode active material. Moreover, the discharge capacity (mAh/g), the initial efficiency (%) and the capacity retention rate (%) are also enhanced. As of now, the reason of the change of the discharge characteristics of the lithium secondary battery on the kind of binder is not clarified.

Although the present invention was described in detail with reference to the above examples, this invention is not limited to the above disclosure and every kind of variation and modification may be made without departing from the scope of the present invention.

What is claimed is:

1. A lithium secondary battery, comprising:
    a negative electrode comprising a negative electrode active material, the negative electrode active material comprising:
        a coal-based powdery green coke; and
        a coal-based powdery calcined coke within a mass ratio range of 70:30 to 30:70 which are fired within a temperature range of 800° C. to 1400° C., and are not fired at a temperature greater than 1400° C.,
    wherein:
        each of the powdery green coke and the powdery calcined coke has an average particle diameter within a range of 5 μm to 15 μm and a BET specific surface area of 2 m$^2$/g to 5 m$^2$/g, and
        the lithium secondary battery has an output characteristic of 10 W or more, a discharge characteristic of 250 mAh/g or more, an initial efficiency of 80% or more and a capacity retention rate of 70% or more.

2. The lithium secondary battery as set forth in claim 1, wherein the negative electrode active material further comprises a binder.

3. The lithium secondary battery as set forth in claim 2, wherein said binder is made from at least one of polyvinylidene fluoride and polyimide.

4. The lithium secondary battery as set forth in claim 3, wherein said binder is made from polyimide.

* * * * *